(12) United States Patent
Takahashi et al.

(10) Patent No.: US 9,367,361 B2
(45) Date of Patent: Jun. 14, 2016

(54) INFORMATION PROCESSING DEVICE, METHOD FOR PROCESSING INFORMATION, AND NON-TRANSITORY COMPUTER-READABLE RECORDING MEDIUM HAVING STORED THEREIN INFORMATION PROCESSING PROGRAM

(71) Applicant: FUJITSU LIMITED, Kawasaki-shi, Kanagawa (JP)

(72) Inventors: Hidekazu Takahashi, Kawasaki (JP); Miho Murata, Kawasaki (JP); Yuichi Tsuchimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/521,943

(22) Filed: Oct. 23, 2014

(65) Prior Publication Data
US 2015/0135192 A1 May 14, 2015

(30) Foreign Application Priority Data
Nov. 8, 2013 (JP) ................. 2013-232258

(51) Int. Cl.
*G06F 9/46* (2006.01)
*G06F 9/50* (2006.01)
*G06F 9/48* (2006.01)

(52) U.S. Cl.
CPC ............ *G06F 9/5083* (2013.01); *G06F 9/4843* (2013.01); *G06F 2209/5022* (2013.01)

(58) Field of Classification Search
CPC ................ G06F 9/5083; G06F 9/4843; G06F 2209/5022
USPC ........................................................ 718/105
See application file for complete search history.

(56) References Cited

U.S. PATENT DOCUMENTS

2013/0124585 A1\* 5/2013 Suzuki ................ G06F 11/1076
707/822
2015/0006716 A1\* 1/2015 Suchter ................ G06F 9/5038
709/224

FOREIGN PATENT DOCUMENTS

JP 2001-101150 4/2001
JP 2010-244096 10/2010

\* cited by examiner

*Primary Examiner* — Anna Deng
(74) *Attorney, Agent, or Firm* — Fujitsu Patent Center

(57) ABSTRACT

There is provided an information processing device includes a task executor and a controller. The task executor executes one or more second tasks that are generated by execution of a first task. The controller that controls the task executor such that the number of tasks to be executed in parallel is adjusted on the basis of a usage degree representing a degree of usage of resource in the information processing device.

16 Claims, 13 Drawing Sheets

FIG. 13

| JOB ID | PROCESS ID |
|---|---|
| JID#1 | PID#1 |
| JID#1 | PID#2 |
| ⋮ | ⋮ |

INFORMATION PROCESSING DEVICE, METHOD FOR PROCESSING INFORMATION, AND NON-TRANSITORY COMPUTER-READABLE RECORDING MEDIUM HAVING STORED THEREIN INFORMATION PROCESSING PROGRAM

CROSS-REFERENCE TO RELATED APPLICATION

This application is based upon and claims the benefit of priority of the prior Japanese Patent application No. 2013-232258, filed on Nov. 8, 2013, the entire contents of which are incorporated herein by reference.

FIELD

The embodiments discussed herein are an information processing device, a method for processing information, and a non-transitory computer-readable recording medium having stored therein an information processing program.

BACKGROUND

One of known information processing device is capable of executing multiple tasks in parallel (e.g., see Patent Literature 1 and Patent Literature 2).

An example of such an information processing device divides data to be processed into multiple data pieces according to a processing algorithm and thereby generates multiple first data pieces to be processed. The information processing device further divides one or more of the multiple first data pieces that need predetermined processing load into multiple pieces on the basis of the number of data pieces and thereby generates second data pieces to be processed. After that, the information processing device executes the remaining first data pieces that have not divided and the second data pieces in parallel.

Another example of such an information processing device determines the number of divided data pieces that allow the communication between the host device and a device to keep the optimum forwarding speed, divided data on the basis of the determined number of divided data pieces, and then forwards divided data pieces from the host device to the device. The device sequentially reads the data pieces forwarded from the host device in unit of designated data amount and processes the read data pieces in parallel.

Patent Literature 1: Japanese Laid-open Patent Publication No. 2001-101150
Patent Literature 2: Japanese Laid-open Patent Publication No. 2010-244096

SUMMARY

According to one aspect of the embodiments, there is provided an information processing device including a task executor and a controller. The task executor executes one or more second tasks that are generated by execution of a first task. The controller that controls the task executor such that the number of tasks to be executed in parallel is adjusted on the basis of a usage degree representing a degree of usage of resource in the information processing device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is a table depicting information that a control process retains according to the example of the second embodiment.

DESCRIPTION OF EMBODIMENT(S)

Figure 1:
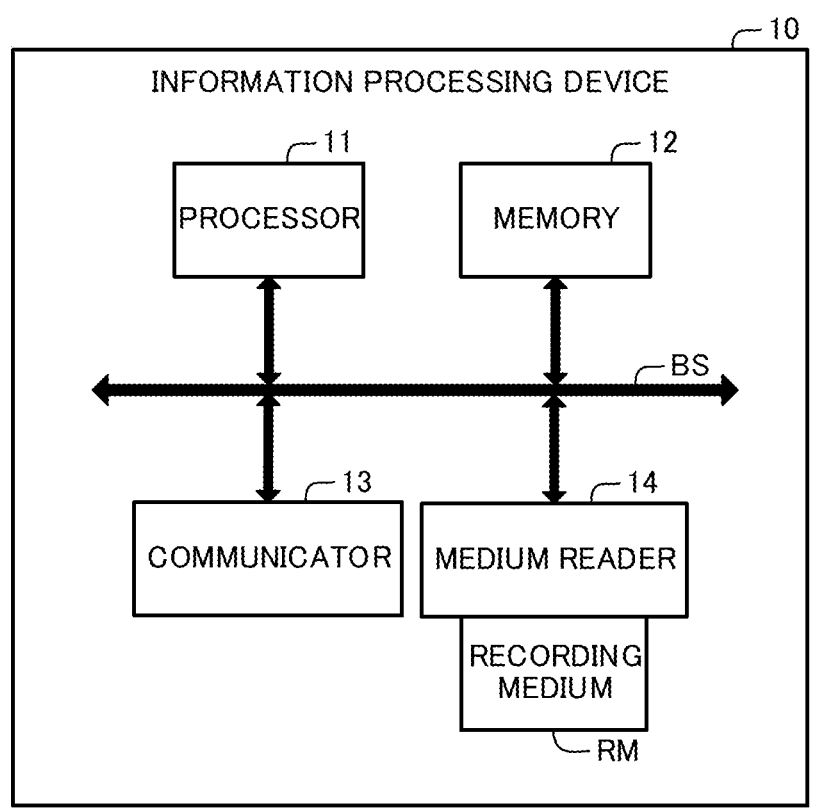
FIG. 1 is a diagram illustrating the configuration of an information processing device according to an example of a first embodiment.

Execution of a task may sometimes generate another task. For example, an assumed job recursively obtains a first web page and a second web page that the first web page refers to and then evaluates all the obtained web pages. This job further assumes that a web page is evaluated by using the result of evaluating another web page (i.e., reference source web page) that refers to the web page to be evaluated.

In this case, the corresponding task includes evaluating a web page (target page) using a result of evaluating the reference source web page and obtains a web page that the target page refers to. This means that the job is completed when all task are completed.

The above Patent Literatures 1 and 2 do not disclose a method of executing such a job efficiently using the resource in the information processing device. In other words, the information processing devices described in the above Patent Literatures 1 and 2 each have a possibility of not efficiently using the resource in the information processing device.

<An Example of a Problem of a Related Technique>

First of all, description will now be made in relation to an example of a problem of an information processing device according to a related technique.

Here, execution of a task may sometimes generate another task. For example, an assumed job recursively obtains a first web page and a second web page that the first web page refers to and then evaluates all the obtained web pages. This job further assumes that a web page is evaluated by using the result of evaluating another web page (i.e., reference source web page) that refers to the web page to be evaluated.

In this case, the corresponding task includes evaluating a web page (target page) using a result of evaluating the reference source web page and obtains a web page that the target page refers to. This means that the job is completed when all task are completed.

The information processing device that adopts the related technique repetitiously carries out a process that executes a task and, if the execution generates another task, executes the generated task.

In this event, the information processing device executes multiple tasks in parallel in accordance with a model (e.g., actor model) for parallel processing. The information processing device generates a process for each task and executes the task with the corresponding process. The actor model calls such a process also an actor.

This makes it possible to reduce time that is taken to complete the job.

When execution of a task constituting a job generates multiple tasks, the multiple tasks have no dependency of one another. This means that one of the multiple new tasks can be executed without using a result of executing another one of the multiple tasks, which allows the information processing device to execute the multiple new tasks in parallel. For this purpose, when execution of a task generates multiple tasks, the information processing device generates processes as many as the multiple new tasks so that the multiple tasks can be executed in parallel.

Such an above job does not grasp the number of prospective tasks that will be generated by executing a task in advance. As a consequence, there is a possibility that a drastic increase of new tasks generates an excessively large number of processes. This sometimes exhausts resource (e.g., a memory region of the memory device and/or time for which the information processing device can execute process) in the information processing device. The problem is that the resource in the information processing device has not been efficiently used.

Hereinafter, description will now be made in relation to embodiments related to an information processing device, a method of processing information, and a non-transitory computer-readable recording medium having stored therein an information processing program with reference to the accompanying drawings FIGS. 1-13.

First Embodiment

Overview

An information processing device according to the first embodiment includes a task executor and a controller. The task executor executes tasks generated by executing a task; and the controller controls the task executor such that the number of tasks to be executed in parallel is adjusted on the basis of a usage degree representing a degree of usage of the resource in the information processing device.

Namely, the number of tasks to be executed in parallel is adjusted on the basis of the usage degree. This avoids a circumstance where the information processing device executes excessive tasks in parallel. Consequently, the resource in the information processing device can be efficiently used.

Hereinafter, description will now be made in relation to an information processing device of the first embodiment.

(Configuration)

As illustrated in FIG. 1, an information processing device 10 according to a first embodiment includes a processor 11, a memory 12, a communicator 13, and a medium reader 14, which are communicably connected to one another via bus BS.

For example, the information processing device 10 is a computer (e.g., a server or a client terminal). Alternatively, the information processing device 10 may be multiple computers. The information processing device 10 may include multiple processors 11 and/or multiple memories 12. For example, the information processing device 10 may be a rack-mount server or a blade server. Alternatively, the information processing device 10 may be achieved by multiple servers communicably connected to one another.

The processor 11 processes information and also controls the devices included in the information processing device 10 through executing a program recorded (stored) in the memory 12. Thereby, the information processing device 10 achieves various functions that are to be detailed below. An example of the processor 11 is a Central Processing Unit (CPU). Alternatively, the processor 11 may be a Large Scale Integration (LSI) or a Programmable Logic Device (PLD).

The memory 12 readably and writably stores therein data. For example, the memory 12 includes at least one of a Random Access Memory (RAM), a Read Only Memory (ROM), a Hard Disk Drive (HDD), a Solid State Drive (SSD), a semiconductor memory, and an organic memory. In this first embodiment, the memory 12 is equipped with a RAM and a HDD.

The communicator 13 is connected to a non-illustrated communication network (in this embodiment, an Internet Protocol (IP) network). The communicator 13 is communicable with other devices via the communication network.

A recording medium RM is mountable on the medium reader 14. The medium reader 14 is capable of reading information stored in the recording medium RM in a state of being mounted on the medium reader 14. In the first embodiment, the recording medium RM is portable. Examples of the recording medium RM are a flexible disk, an optical disk, a magnetic disk, a magneto-optical disk, and a semiconductor memory. In the first embodiment, the program is previously stored in the memory 12. Alternatively, the program may be stored in the recording medium RM.

(Function)

Figure 2:
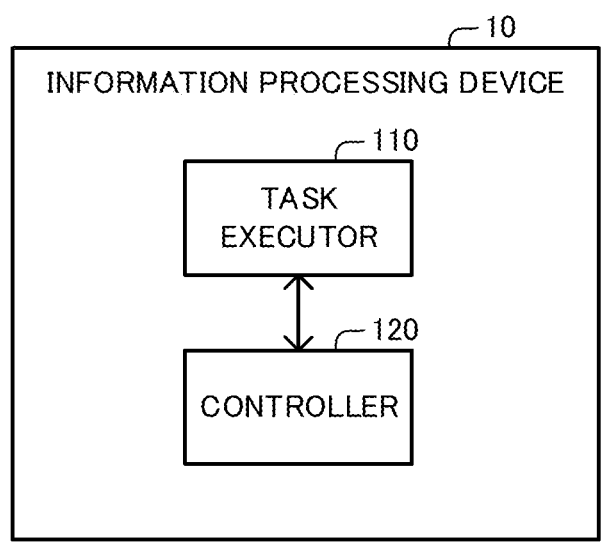
FIG. 2 is a block diagram illustrating the function of an information processing device according to the example of the first embodiment.

FIG. 2 is a block diagram schematically illustrating the function of the information processing device 10. The information processing device 10 includes the functions of a task executor 110 and a controller 120. The task executor 110 and the controller 120 may be achieved by respective different processors 11 or by respective different computers.

In the first embodiment, a job is to recursively obtain a first web page and a second web page (i.e., reference destination web page) that the first web page refers to and then evaluate all the obtained web pages. Furthermore, the job evaluates a web page using the result of evaluating another web page (i.e., reference source web page) that refers to the web page to be evaluated. In this case, the corresponding task includes obtaining a web page (target page), evaluating the obtained target page on the basis of a result of evaluating the reference source web page, and specifying a web page (i.e., reference destination web page) that the target page refers to. Accordingly, in executing the job, execution of a task may cause another task.

Figure 3:
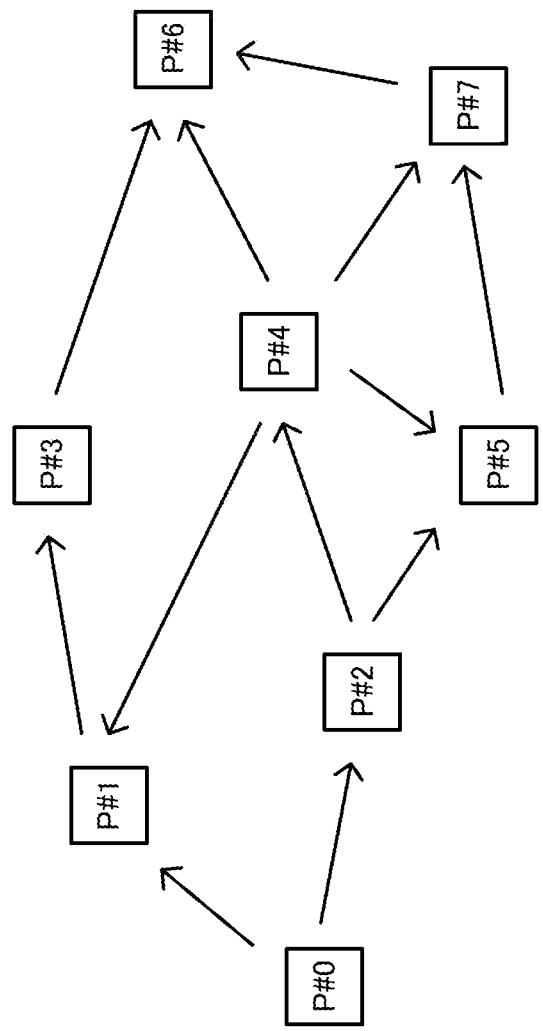
FIG. 3 is a diagram schematically illustrating the relationship between a reference source web page and a reference destination web page of a job of the example of the first embodiment.

For example, as illustrated in FIG. 3, a job recursively obtains a certain web page P#0 and web pages P#1-P#7 (i.e., reference destination web pages) that the web page P#0 refers to, and evaluates all the obtained web pages P#0-P#7. Arrows in FIG. 3 represent the relationship between each reference source web page and its reference destination web page. For example, the arrow from the web page P#0 to the web page P#1 represents that the web page P#1 is referred by the web page P#0.

Figure 4:
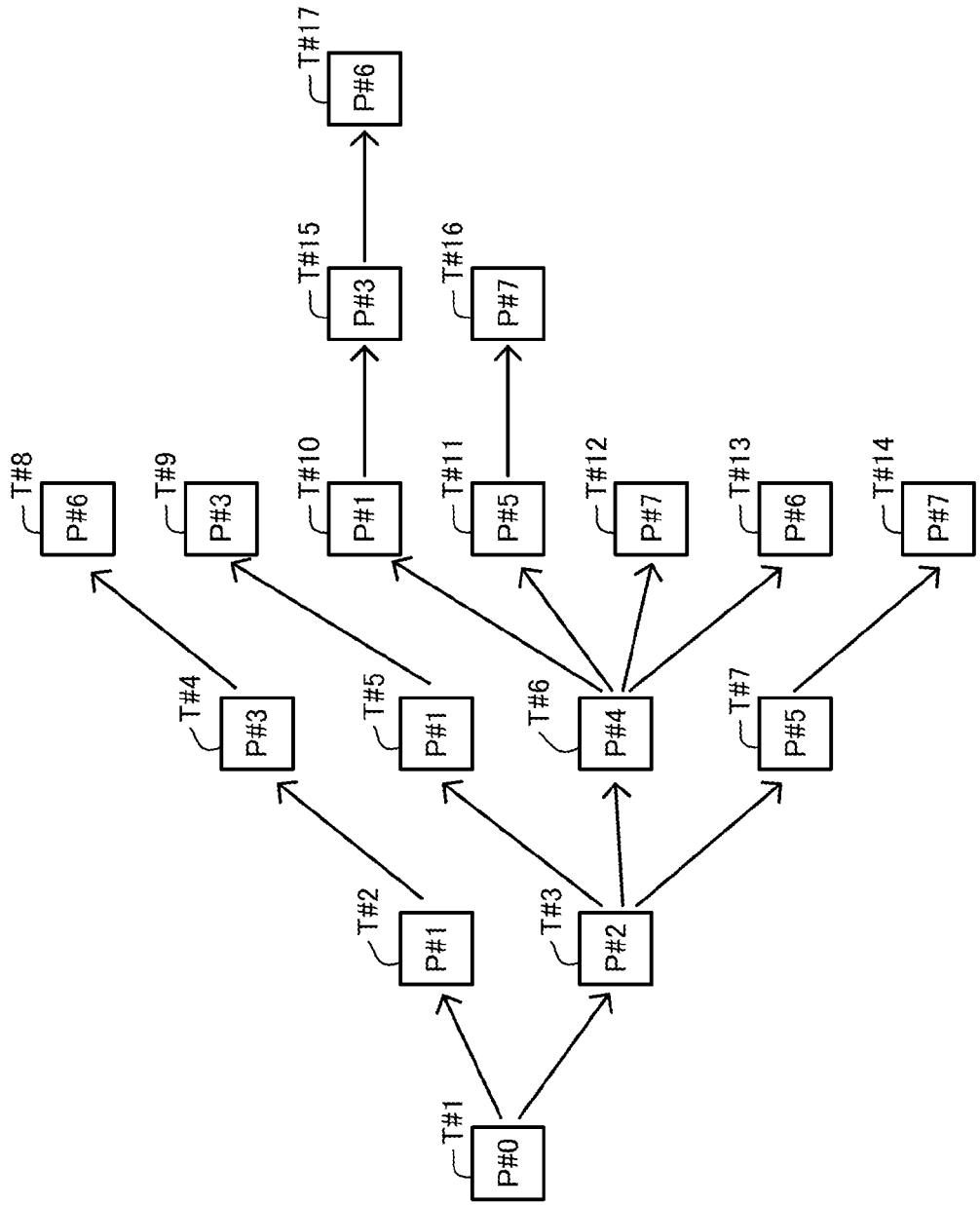
FIG. 4 is a diagram schematically illustrating multiple tasks that constitute a job in the example of the first embodiment.

As illustrated in FIG. 4, this job includes 17 tasks T#1-T#17. The first task (T#1) includes obtaining the web page (target page) P#0, evaluating the obtained web page P#0, and specifying the web pages P#1 and P#2 referred by the target page P#0. Execution of the first task T#1 generates two tasks (i.e., the second task T#2 and the third task T#3).

The second task (T#2) includes obtaining a web page (target page) P#1, evaluating the obtained target page P#1 on the basis of the result of evaluating the reference source web page P#0, and specifying a reference destination web page P#3 referred by the target web page P#1. The third task (T#3) includes obtaining a web page (target page) P#2, evaluating the obtained target page P#2 on the basis of the result of evaluating the reference source web page P#0, and specifying a reference destination web pages P#1, P#4, and P#5 referred by the target web page P#2.

Furthermore, execution of the second task (T#2) generates a single new task (the fourth task T#4). The fourth task (T#4) includes obtaining a web page (target page) P#3, evaluating the obtained target page P#3 on the basis of the result of evaluating the reference source web page P#1, and specifying a reference destination web page P#6 referred by the target web page P#3.

Here, execution of the third task (T#3) generates three new tasks (the fifth task T#5, the sixth task T#6, and the seventh task T#7). The fifth task (T#5) includes obtaining a web page (target page) P#1, evaluating the obtained target page P#1 on the basis of the result of evaluating the reference source web page P#2, and specifying a reference destination web page P#3 referred by the target web page P#1.

The sixth task (T#6) includes obtaining a web page (target page) P#4, evaluating the obtained target page P#4 on the basis of the result of evaluating the reference source web page P#2, and specifying a reference destination web pages P#1, P#5, P#7, and P#6 referred by the target web page P#4. The seventh task (T#7) includes obtaining a web page (target page) P#5, evaluating the obtained target page P#5 on the basis of the result of evaluating the reference source web page P#2, and specifying a reference destination web page P#7 referred by the target web page P#5.

When execution of a task of a job generates multiple tasks, the multiple tasks have no dependency of one another. This means that one of the multiple new tasks can be executed without using a result (in the first embodiment, a result of evaluating) of executing another one of the multiple tasks. In this example, the second task and the third task has not dependency of each other, and the fifth-seventh tasks has no dependency of one another.

The task executor 110 executes a task and in cases where the execution generates another task, executes the generated task. The task executor 110 repeats this procedure to thereby complete the execution of multiple tasks consisting of the corresponding job. The job is completed when all the tasks are completed.

As described above, if execution of a task generates multiple tasks in the execution of the above job, the multiple newly generated tasks have no dependency of one another, which makes the multiple tasks possible to be executed in parallel. For this reason, the task executor 110 is configured to be capable of executing multiple tasks in parallel.

The task executor 110 of the first embodiment achieves its function by generating a process (task process) for executing the procedure that is to be detailed below.

A process can be executed independently from other processes and can exchange various pieces of information with other processes. Namely, the process can execute inter-process communication (in the first embodiment, message passing). Each process has a memory region (i.e., buffer region) dedicated to the process (in the first embodiment, the memory region is associated with the process). When a process is to be generated, a buffer region associated with the prospective process is reserved in a memory region of the memory 12. When a process is to disappear, the buffer region associated with the process is to be released.

In the first embodiment, such a process functions as an actor in the actor model.

The task executor 110 generates a single task process when the information processing device 10 receives a job-execution instruction to execute a job. A task process is a process to execute a task. As will be detailed below, a task process executes only a single task. Accordingly, the task executor 110 executes multiple tasks constituting a job through execution of the multiple tasks by multiple task processes generated one for each of the multiple tasks.

A task that is to be executed by a task process generated when the information processing device 10 receives a job-execution instruction is an example of an initial task that is to be executed at first in the execution of the job related to the job-execution instruction.

A job-execution instruction is an instruction to execute a job. A job-execution instruction includes unexecuted task information representing a single task. Such unexecuted task information is information to execute an unexecuted task that has not been executed yet.

In the present embodiment, unexecuted task information included in a job-execution instruction includes information (e.g., information representing a Uniform Resource Identifier (URI)) to specify a certain web page (target page) and information representing an evaluation program. The evaluation program executes the procedure of: obtaining a target page; evaluating the obtained target page using the result of evaluating a reference source web page of the target page; and specifying a reference destination web page that the target page refers to.

For example, a job-execution instruction may be input into the information processing device 10 by the user of the information processing device 10. Alternatively, a job-execution instruction may be input into the information processing device 10 from another device that is communicably connected to the information processing device 10.

The task executor 110 sends the unexecuted task information included in a job-execution instruction to a generated task process.

The task process retains the unexecuted task information that has been sent to the task process. In the first embodiment, the task process retains the unexecuted task information by storing the unexecuted task information into a buffer region. Furthermore, in the present embodiment, the unexecuted task information is retained in accordance with the LIFO or FILO method. The terms LIFO and FILO are abbreviations of Last In First Out and First In Last Out, respectively. For example, the unexecuted task information is managed in a stack data structure.

A task process obtains a piece of unexecuted task information from the retained unexecuted task information, and ends to retain the obtained piece of unexecuted task information (in this example, by removing the obtained piece of unexecuted task information from the buffer region). Then the task process executes the task represented by the obtained piece of unexecuted task information.

When execution of a task generates another task, the task process newly retains unexecuted task information representing the generated task. In the present embodiment, the unexecuted task information that is to be newly retained includes information to specify a reference destination web page, information representing the evaluation program, and information representing the result of evaluating the reference source web page.

A task represented by the retained unexecuted task information is an example of a task included in an unexecuted task group. Newly retaining unexecuted task information means that a task that execution of another task generates is added to the unexecuted task group.

When a task process retains one or more pieces of unexecuted task information at the completion of execution of a task, the task process sends a control process that is to be detailed below a request for the upper limit of generated process number. A request for the upper limit of generated process number is information to request to send the upper limit of generated process number. The upper limit of generated process number is the upper limit of the number of task processes that a single task process newly generates. Here, adjusting the upper limit of generated process number is an example of adjusting the number of tasks to be executed in parallel. Accordingly, a request for the upper limit of generated process number can be regarded as a request for the number of tasks that can be executed in parallel (e.g., called a request for the upper limit number).

As to be detailed below, a task process receives the upper limit of generated process number from the control process. A task process generates one or more task processes to execute one or more tasks represented by the retained unexecuted task information, the one or more task process being the same in number as a smaller one of the number of pieces of retained unexecuted task information (the number of unexecuted tasks) and the received upper limit of generated process number.

When the task process generates another task process, the task process sends all the pieces of the retained unexecuted task information to the generated task process. On the other hand, when the task process generates multiple task processes, the task process distributes all the pieces of the retained unexecuted task information to the generated multiple task processes.

When the corresponding task is completed, the task process disappears.

The task executor 110 executing only a single task with a single task process at a time is an example that the information processing device 10 executes a task according to the sequential execution method. In contrast, the task executor 110 executing multiple tasks in parallel with multiple task processes is an example that the information processing device 10 executes tasks according to the parallel execution method.

The controller 120 controls the task executor 110 such that the number of task processes to be generated is adjusted on the basis of a usage degree that represents a degree of usage of resource in the information processing device 10.

For example, the resource in the information processing device 10 is a memory region that the memory 12 has or time during which the processor 11 can execute processing. In the present embodiment, the usage degree corresponds a using ratio of the memory region of the RAM included in the memory 12 (i.e., a memory usage ratio). The memory usage ratio is a ratio in capacity of a memory region being used (and being reserved for future use) to the total capacity of the memory region that the RAM has.

Alternatively, the usage degree may be a parameter that represents a capacity (i.e., vacant capacity) of the memory region that has not been used (i.e., available) among the memory region of the RAM has. In this case, the parameter come to be smaller as the vacant capacity increases. Further alternatively, the usage degree may be a using ratio of the processor 11 (i.e., CPU using ratio). A CPU using ratio is a ratio of time period during which the processor 11 is used to a time period of a unit time. The usage degree may be a value based on arbitrary two or more of a memory using rate, a parameter representing a vacant capacity, and a CPU using ratio, and is exemplified by a weighted average value.

The controller 120 achieves its function by generating a process (control process) that executes a procedure to be described below.

When the information processing device 10 receives a job-execution instruction, the controller 120 generates a control process.

A control process retains the upper limit of generated process number. In the present embodiment, the control process retains the upper limit of generated process number by storing the upper limit of generated process number into a buffer region associated with the control process. The control process retains the value "1" to be the initial value of the upper limit of generated process number.

The control process obtains the usage degree each time a certain obtaining period elapses. Alternatively, the control process may obtain the usage degree upon receipt of a request for the upper limit of generated process number from a task process.

The control process receives a request for the upper limit of generated process number from a task process. When the control process receives a request for the upper limit of generated process number, the control process adjusts the retained upper limit of generated process number on the basis of the obtained latest usage degree.

In the present embodiment, when the usage degree (here, a memory using ratio) is equal to or larger than the first threshold (here, 60%), the control process reduces the upper limit of generated process number. In the present embodiment, the control process updates the retained upper limit of generated process number to a value obtained by dividing the retained upper limit of generated process number by a certain fluctuation coefficient (in this example, the value "two").

On the contrary, when the usage degree is smaller than the first threshold, the control process increases the upper limit of generated process number. In the present embodiment, the control process updates the retained upper limit of generated process number to a value obtained by multiplying the retained upper limit of generated process number by the above fluctuation coefficient.

Furthermore, when the updated upper limit of generated process number is smaller than the value "1" of the lower-limit threshold, the control process sets (updates) the retained upper limit of generated process number to be "1". In contrast, when the updated upper limit of generated process number is larger than the value "128" of the upper-limit threshold, the control process sets the retained upper limit of generated process number to be the upper-limit threshold.

The control process sends the retained upper limit of generated process number to a task process that has sent a request for the upper limit of generated process number.

(Operation)

Next, description will now be made in relation to the operation of the above information processing device 10 with reference to FIGS. 5-7.

First of all, the information processing device 10 receives a job-execution instruction. In response to the received instruction, the information processing device 10 generates a single control process and a single task process TP#1. Accordingly, a buffer region associated with the control process and a buffer region associated with the task process TP#1 are reserved.

Furthermore, the information processing device 10 sends unexecuted task information (first unexecuted task information) included in the job-execution instruction to the generated task process TP#1. The first unexecuted task information is information representing the task (first task) T#1. In the present embodiment, the first unexecuted task information includes information to specify a web page (target page) P#0 and information representing the evaluation program.

Figure 5:
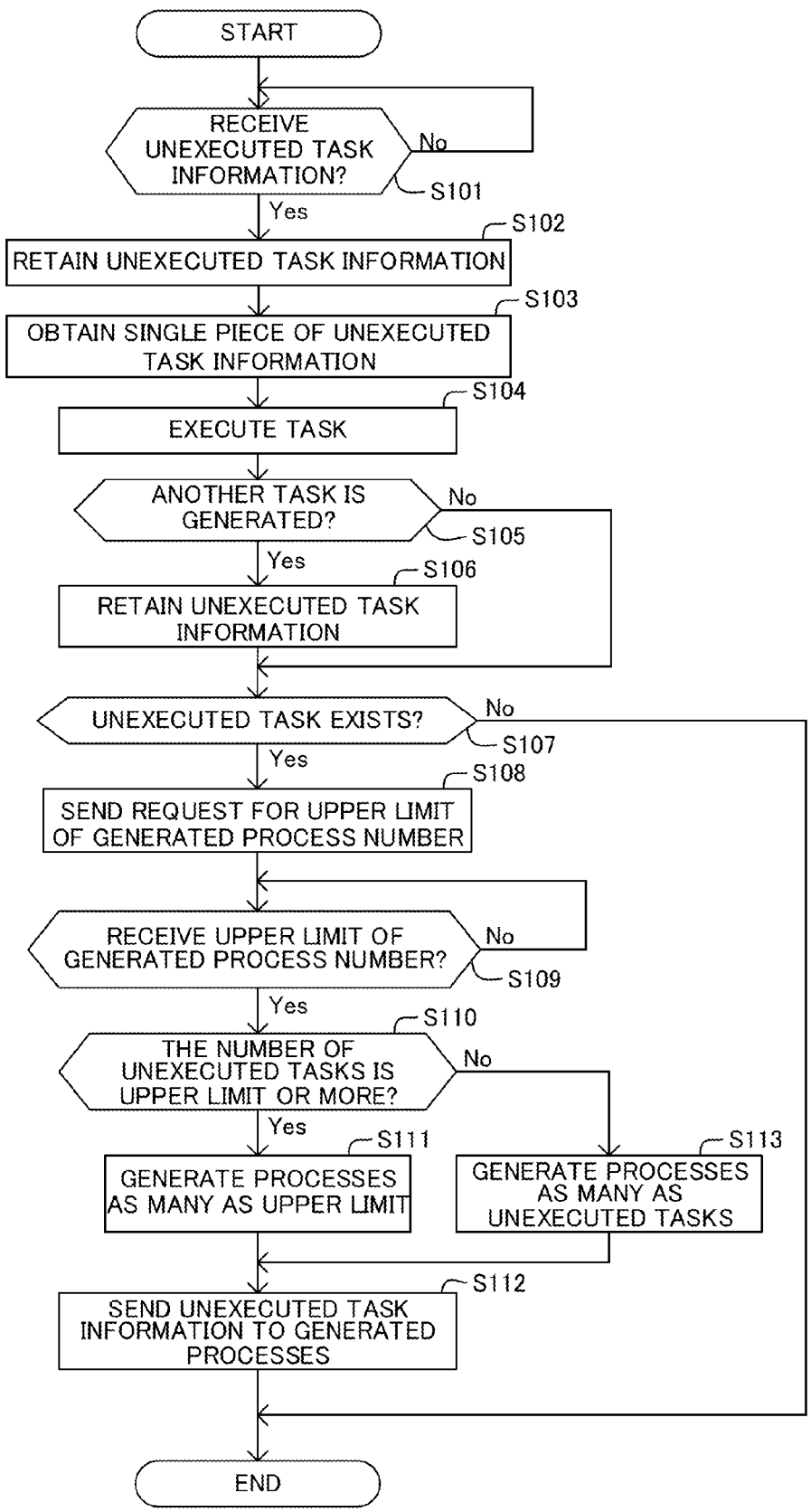
FIG. 5 is a flow diagram illustrating a succession of procedural steps that a task process executes in the example of the first embodiment.

The task process TP#1 carries out the procedure of the flow diagram of FIG. 5. In this example, the task process TP#1 is on standby until receiving unexecuted task information ("No" route of step S101 of FIG. 5). According to the above assumption, the task process TP#1 receives the first unexecuted task information. Thereby, the task process TP#1 determines "Yes" in step S101 and newly retains the received first unexecuted task information (step S102 of FIG. 5).

Next, the task process TP#1 obtains one piece (first unexecuted task information) from the retained unexecuted task information (step S103 of FIG. 5). Thereby, the task process TP#1 ends to retain the obtained first unexecuted task information. Then, the task process TP#1 executes the task T#1 represented by the obtained first unexecuted task information (step S104 of FIG. 5).

In the present embodiment, the task process TP#1 obtains the web page (target page) P#0, evaluates the obtained web page P#0, and specifies the reference destination web pages P#1 and P#2 that the target web page P#0 refers to by executing the task T#1. This further generates a task T#2 (second task) and a task T#3 (third task).

The task process TP#1 determines whether execution of the task generates another task (step S105 of FIG. 5). Then, the task process TP#1 determines "Yes" and newly retains second unexecuted task information representing the new task T#2 and third unexecuted task information representing the new task T#3 (see step S106 of FIG. 5).

In the present embodiment, the second unexecuted task information includes information to specify the reference destination web page P#1, information representing the evaluation program, and information representing the result of evaluating the reference source web page P#0. Likewise, the third unexecuted task information includes information to specify the reference destination web page P#2, information representing the evaluation program, and information representing the result of evaluating the reference source web page P#0.

In contrast, when execution of the task generates no task, the task process TP#1 skips step S106 and moves to step S107.

Next, the task process TP#1 determines whether an unexecuted task exists (step S107 of FIG. 5). When the task process TP#1 retains one or more pieces of unexecuted task information, the task process TP#1 determines "Yes" in step S107. At this time point, the task process TP#1 retains two pieces of unexecuted task information. Accordingly, the task process TP#1 determines "Yes" and sends a request for the upper limit of generated process number to the control process (step S108 of FIG. 5).

After that, the task process TP#1 is on standby until receiving an upper limit of generated process number from the control process ("No" route of step S109 of FIG. 5).

Figure 6:
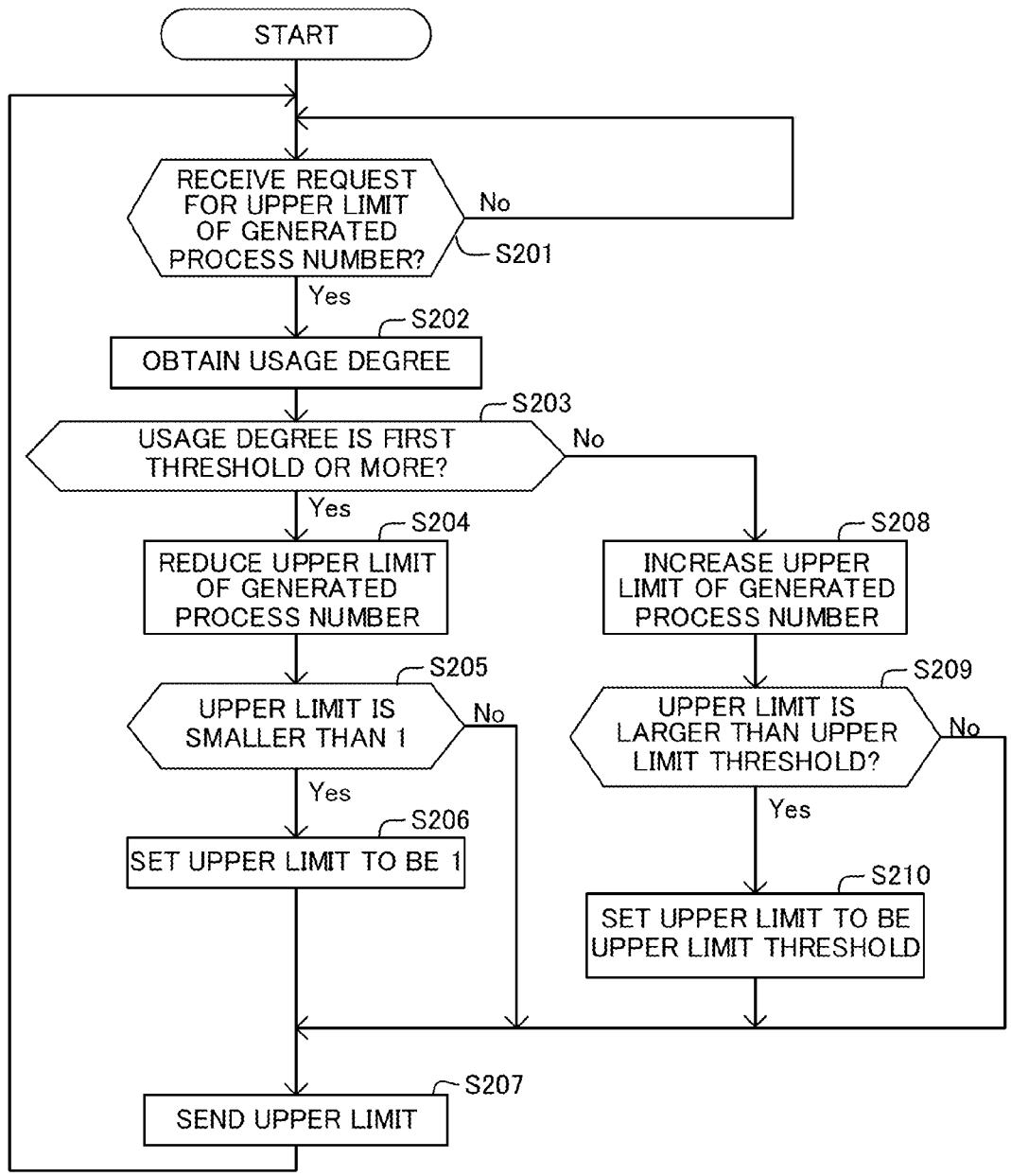
FIG. 6 is a flow diagram illustrating a succession of procedural steps that a control process executes in the example of the first embodiment.

On the other hand, the control process executes the procedure of the flow diagram of FIG. 6. In this example, the control process is on standby until receiving a request for the upper limit of generated process number ("No" route of step S201 of FIG. 6). According to the above assumption, the control process receives the request for the upper limit of generated process number from the task process TP#1. Thereby, the control process determines "Yes" and obtains the latest usage degree among the usage degrees that have been obtained each time an obtaining cycle elapses (step S202 of FIG. 6).

Next, the control process determines whether the obtained usage degree is equal to or larger than a first threshold (step S203 of FIG. 6). Here, the usage degree is assumed to be equal to or larger than a first threshold, and therefore the control process determines "Yes" and decreases the upper limit of generated process number (step S204 of FIG. 6). In the present embodiment, the control process updates the upper limit (at that time point "1") of generated process number to a value obtained (in this example "0.5") by dividing the upper limit by the above fluctuation coefficient (in this example "2").

Next, the control process determines whether the retained upper limit of generated process number is equal to or smaller than "1" (step S205 of FIG. 6). At this time point, since the upper limit of generated process number is "0.5", the control process determines "Yes" and sets the upper limit to be "1" (step S206 of FIG. 6). In contrast, when the upper limit of generated process number is equal to or larger than "1", the control process skips step S206 and moves to step S207.

Then, the control process sends the retained upper limit of generated process number to the task process (here the task process TP#1) that has sent the request for the upper limit of generated process number in step S201. After that, the control process returns to step S201 to repeat the procedure of step S201 to step S210. The procedure of step S208 to S210 will be detailed below.

The task process TP#1 receives the upper limit of generated process number from the control process. Thereby, the task process TP#1 determines "Yes" in step S109 of FIG. 5 and further determines whether the number of unexecuted tasks is equal to or larger than the upper limit of generated process number (step S110 of FIG. 5). In this example, the number of unexecuted tasks corresponds to the number of pieces of the retained unexecuted task information.

At this time point, the number of unexecuted tasks is "2" and the upper limit of generated process number is "1". Accordingly, the task process TP#1 determines "Yes" and generates task processes as many as the number of the upper limit of generated process number (step S111 of FIG. 5). Namely, the task process TP#1 generates a single task process at this time point.

Figure 7:
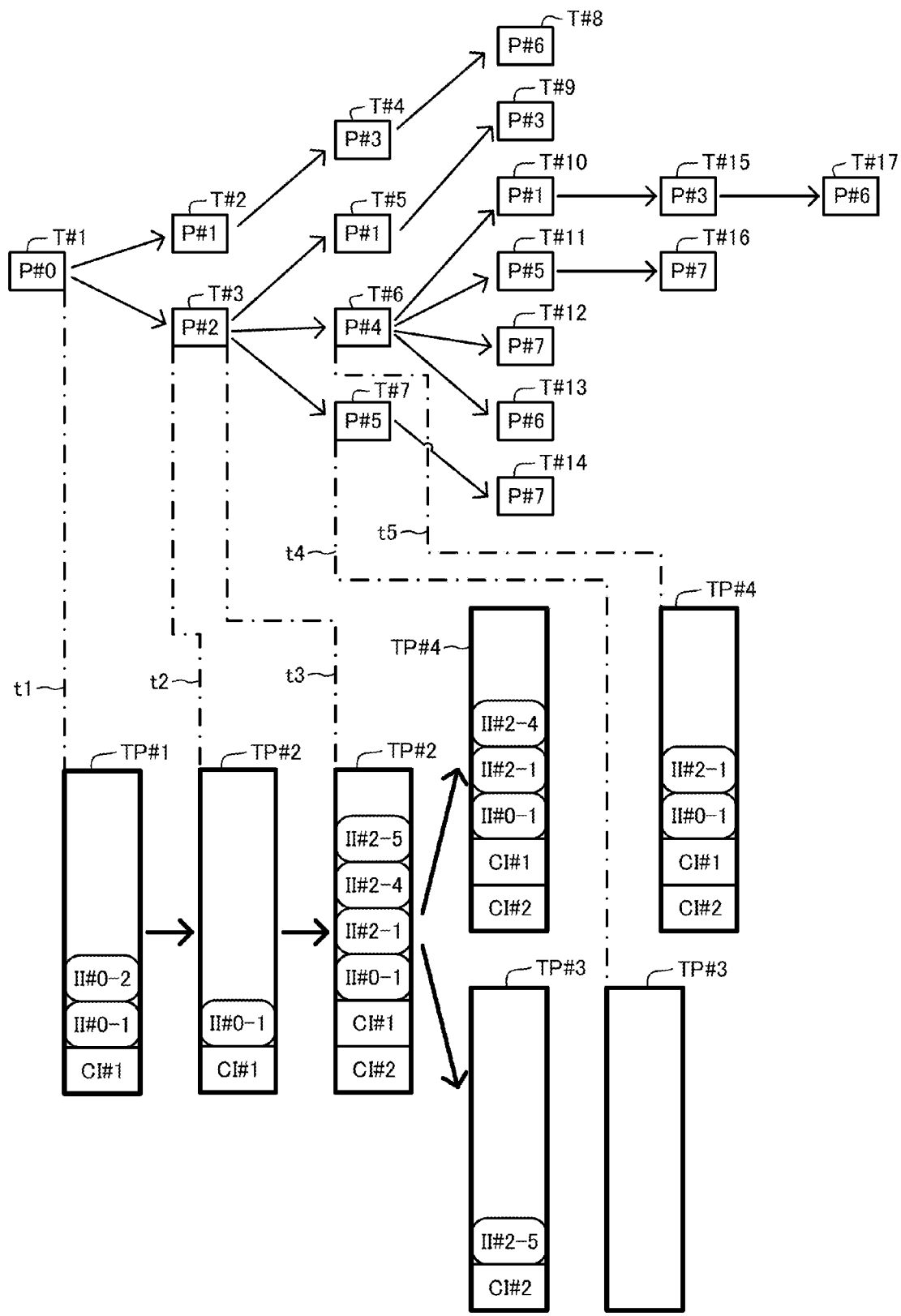
FIG. 7 is a diagram schematically illustrating change in task process and change in information that the task process retains in the example of the first embodiment.

As illustrated in FIG. 7, the task process TP#1 retains the second unexecuted task information and the third unexecuted task information at this time point t1.

In the present embodiment, each piece of unexecuted task information consists of individual information and common information. Individual information is peculiar to each unexecuted task and, in the present embodiment, is information to specify the reference destination web page. The common information is information common to unexecuted tasks. In the present embodiment, the common information consists of information representing the evaluation program and information representing the result of evaluating the reference source web page.

In the present embodiment, when multiple pieces of unexecuted task information have the same common information, a task process retains a single piece of the common information. For example, the second unexecuted task information consists of individual information II#0-1 and common information CI#1 while the third unexecuted task information consists of individual information II#0-2 and common information CI#1. Here, multiple pieces of unexecuted task information (in this example, the second unexecuted task information and the third unexecuted task information) include the same common information CI#1. Accordingly, the task process TP#1 retains the individual information II#0-1 of the second unexecuted task information, the individual information II#0-2 of the third unexecuted task information, and the common information CI#1.

When the number of unexecuted tasks is less than the upper limit of generated process number, the task process TP#1 determined "No" in step S110, and generates task processes as many as the unexecuted task (step S113 of FIG. 5).

Next, the task process TP#1 sends all the pieces of retained unexecuted task information (here, the second unexecuted task information and the third unexecuted task information) to the generated task process TP#2 (step S112 in FIG. 5). In the present embodiment, the task process TP#1 sends the individual information II#0-1 and II#0-2 and the common information CI#1 to the task process TP#2.

The task process TP#1 ends the procedure of FIG. 5. Thereby, the task process TP#1 disappears, and consequently, the buffer region associated with the task process TP#1 is released.

When no unexecuted task exists by the time the procedure reaches step S107, the task process TP#1 skips steps S108 to S113 and ends the procedure of FIG. 5.

Likewise the task process TP#1, the task process TP#2 executes the procedure of FIG. 5. Accordingly, the task process TP#2 retains the unexecuted task information (here, the second unexecuted task information and the third unexecuted task information) received from the task process TP#1. Then the task process TP#2 obtains one piece (here, the third unexecuted task information) of the retained unexecuted task information (step S103 of FIG. 5). Thereby, the task process TP#2 ends to retain the obtained third unexecuted task information. Namely, as illustrated in FIG. 7, the task process TP#2 retains the individual data II#0-1 and the common information CI#1 at the time point t2.

Then, the task process TP#2 executes a task T#3 represented by the obtained third unexecuted task information (step S104 of FIG. 5).

In the present embodiment, through executing the task T#3, the task process TP#2 obtains web page (target page) P#2, evaluates the obtained target page P#2, and specifies reference destination web page P#1, P#4, and P#5 referred by the target page P#2. This further generates new tasks T#5 (fifth task), T#6 (sixth task), and T#7 (seventh task).

The task process TP#2 newly retains unexecuted task information (here, fifth unexecuted task information, sixth unexecuted task information, and seventh unexecuted task information) representing the newly generated tasks T#5, T#6, and T#7 (step S106 of FIG. 5). In the present embodiment, the fifth unexecuted task information consists of individual information II#2-1 and the common information CI#2; the sixth unexecuted task information consists of individual information II#2-4 and the common information CI#2; and the seventh unexecuted task information consists of individual information II#2-5 and the common information CI#2.

The task process TP#2 then sends a request for the upper limit of generated process number to the control process (step S108 of FIG. 5).

Upon receipt of the request for the upper limit of generated process number from the task process TP#2, the control process determines whether the obtained usage degree is equal to or larger than the first threshold (step S203 of FIG. 6). Here, the usage degree is assumed to be smaller than the first threshold. In this case, the control process determines "No" and increases the upper limit of generated process number (step S208 of FIG. 6). In the present embodiment, the control process updates the upper limit (at this time point, "1") of generated process number to a value obtained (in this example, "2") by multiplying the upper limit by the above fluctuation coefficient (in this example "2").

Next, the control process determines whether the retained upper limit of generated process number is larger than an upper limit threshold (in this example, "128") (step S209 of FIG. 6). At this time point, the upper limit of generated process number is "2", and the control process determines "No" and sends the retained upper limit of generated process number to the task process (here, the task process TP#2) that has sent the request for the upper limit of generated process number in step S201.

After that, the control process returns to step S201 to repeat the procedure of step S201 to step S210.

When the upper limit of generated process number updated in step S208 is larger than the upper limit threshold, the control process sets the retained upper limit of generated process number to be the upper limit threshold (step S210 of FIG. 6) and then moves to step S207.

The task process TP#2 receives the upper limit of generated process number from the control process. At this time point, the number of unexecuted tasks are "4" and the upper limit of generated process number is "2". Accordingly, the task process TP#2 determines "Yes" and generates task processes as many as the upper limit of generated process number (step S111 of FIG. 5). At this time point, the task process TP#2 generates two task processes TP#3 and TP#4.

As illustrated in FIG. 7, the task process TP#2 retains unexecuted task information (here, the second unexecuted task information, the fifth unexecuted task information, the sixth unexecuted task information, and the seventh unexecuted task information) at time point t3.

Then, the task process TP#2 distributes the retained unexecuted task information to the multiple generated task processes TP#3 and TP#4.

In the present embodiment, a task process sends a certain distribution number (here "3") of pieces of unexecuted task information to a single task process and sends the remaining pieces of unexecuted task information to one or more other processes. In this example, the task process TP#2 sends the second unexecuted task information, the fifth unexecuted task information, and the sixth unexecuted task information to the task process TP#4 while sends the seventh unexecuted task information to the task process TP#3.

More specifically, the task process TP#2 sends individual information II#0-1, II#2-1, and II#2-4 and the common information CI#1 and CI#2 to the task process TP#4 while sends individual information II#2-5 and common information CI#2 to the task process TP#3.

Alternatively, a task process may distribute multiple pieces of unexecuted task information to task processes such that each task process receives the same number of pieces of unexecuted task information.

Then the task process TP#2 ends the procedure of FIG. 5, and thereby disappears. Accordingly, the buffer region associated with the task process TP#2 is released.

Likewise the task processes TP#1 and TP#2, the task processes TP#3 and TP#4 each execute the procedure of FIG. 5.

The task process TP#3 obtains one piece (here, the seventh unexecuted task information) of the retained unexecuted task information (step S103 of FIG. 5). The task process TP#3 ends to retain the obtained seventh unexecuted task information. Namely, as illustrated in FIG. 7, the task process TP#3 retains no unexecuted task information at this time point t4.

Likewise, the task process TP#4 obtains one piece (here, the sixth unexecuted task information) of the retained unexecuted task information (step S103 of FIG. 5). The task process TP#4 ends to retain the obtained sixth unexecuted task information. Namely, as illustrated in FIG. 7, the task process TP#4 retains individual information II#0-1 and II#2-1 and common information CI#1 and CI#2 at the time point t5.

Then, the task process TP#3 executes the task T#7 represented by the obtained seventh unexecuted task information (step S104 of FIG. 5) and the task process TP#4 executes the task T#6 represented by the obtained sixth unexecuted task information (step S104 of FIG. 5). In other words, the information processing device 10 executes these two tasks in parallel.

After that, likewise the above, the task processes TP#3 and TP#4 each send a request for the upper limit of generated process number to the control process (step S108 of FIG. 5).

Responsively, the control process adjusts the upper limit of generated process number on the basis of the usage degree and sends the adjusted upper limit to the task processes TP#3 and TP#4 (step S207 of FIG. 6).

Upon receipt of the upper limit of generated process number from the control process, the task processes TP#3 and TP#4 each execute the procedure of S110 and after of FIG. 5 as described above.

Along the above manner, the information processing device 10 executes all the tasks constituting the job. Upon completion of all the tasks, the information processing device 10 deletes the control process and then the buffer region associated with the control process is released. Thereby the information processing device 10 completes the job.

As the above, the information processing device 10 of the first embodiment executes individual tasks with the task processes generated one for each task and generates a task process for executing a task generated by execution of the task. At this time, the information processing device 10 deletes the task process that has completed the task.

Furthermore, the information processing device 10 adjusts the number of task processes to be generated on the basis of the usage degree.

In other words, the number of task processes to be generated is adjusted on the basis of the usage degree, which makes it possibility to adjust the number of tasks that the information processing device 10 executes in parallel. Consequently, a circumstance where excessive tasks are being executed in parallel can be avoided, so that the resource in the information processing device 10 can be efficiently used.

When the usage degree is larger than a certain first threshold under a state where a task included in an unexecuted task group at the completion of executing another task, the information processing device 10 of the first embodiment limits the number of task processes to be generated to "1".

This prevents the number of task processes to be generated from sharply increasing as compared to a case where task processes as many as the number of tasks included in the unexecuted task group are generated under a state where the usage degree is relatively large. Consequently, this avoids excessively increase of the usage degree.

Under a state where the usage degree is less than the first threshold and also where the number of tasks included in the unexecuted task group is two or more at the completion of executing a task, the information processing device 10 of the first embodiment generates multiple task processes.

This means that when usage degree is less than the first threshold, at least two task processes are generated. Accordingly, under a state where the usage degree is relatively small, multiple tasks can be executed in parallel with two or more task processes. Consequently, it is possible to increase the number of tasks completed per unit time, avoiding excessively increase of the usage degree.

A task process generated in the information processing device 10 of the first embodiment retains at least one piece of unexecuted task information received from another task process that has generated the task process and obtains a piece of unexecuted task information from the retained unexecuted task information. Furthermore, the task process ends to retain the obtained piece of unexecuted task information and executes the task represented by the obtained piece of unexecuted task information. In addition, in a case where execution of a task generates another task, the task process newly retains unexecuted task information representing the generated task.

Still further, under a state where one or more pieces of unexecuted task information are retained at the completion of executing a task, the task process generates task processes to execute tasks represented by the retained pieces of unexecuted task information. In addition, the task process sends the retained pieces of unexecuted task information to the generated task process and then disappears.

When multiple tasks are generated, the multiple pieces of unexecuted task information representing one for each of the tasks frequently contain information (common information) common to the multiple tasks (i.e., the same information) and information (individual information) peculiar to each individual task.

Providing that the information processing device generates task processes as many as the newly generated multiple tasks, the common information is sent to the multiple task processes. Consequently, the task processes each retain common information, an excessively large region is used in the information processing device.

In contrast, the information processing device 10 adjusts the number of task processes to be generated on the basis of the usage degree. This makes it possible to prevent an excessively large region in the memory of the information processing device 10 from being used.

When a task process generates a single task process to execute a task represented by the retained unexecuted task information, the information processing device 10 sends all the retained unexecuted task information to the generated task process.

This makes it possible to reliably execute a task that has not been executed yet.

When a task process generates multiple task processes, the information processing device 10 distributes the multiple pieces of unexecuted task information to the multiple generated task processes.

This makes it possible to reliably execute tasks that have not been executed yet.

When starting the job, the information processing device 10 generates a single task process to execute an initial task of the job.

This means that multiple tasks are executed in parallel only when the usage degree is relatively small. This can further reliably avoid a circumstance where the usage degree comes to be excessively large. Consequently, the resource in the information processing device 10 can be efficiently used.

Alternatively, the information processing device 10 may increase the upper limit of generated process number by adding a certain additional amount.

Likewise, alternatively, the information processing device 10 may decrease the upper limit of generated process number by subtracting a certain reducing amount.

Further alternatively, the information processing device 10 of the first embodiment may keep the upper limit of generated process number when a certain keeping condition is satisfied. An example of the keeping condition is that the obtained usage degree is smaller than the first threshold and also is equal to or larger than a third threshold. Here, the third threshold is smaller than the first threshold. In this case, the information processing device 10 increases the upper limit of generated process number when the obtained usage degree is smaller than the third threshold.

Alternatively, a job and a task of the first embodiment may be referred to as a task and a substask, respectively.

First Modification of First Embodiment

Next, description will now be made in relation to an information processing device according to a first modification of the first embodiment. The information processing device of the first modification is different from that of the first embodiment in the point that the upper limit of generated process number is set to be a certain value based on the usage degree. The following description will focus on the difference. Like reference numbers designate similar or substantially similar elements and parts between the first embodiment and the first modification.

The control process of the first modification retains a first upper limit of generated process number and a second upper limit of generated process number, which may be both predetermined. Here, the second upper limit is larger than the first upper limit. In this modification, the first upper limit and the second upper limit are "1" and "4", respectively.

When the usage degree is smaller than the first threshold, the control process sets the upper limit of generated process number to the second upper limit of generated process number. In contrast, when the usage degree is equal to or larger than the first threshold, the control process sets the upper limit of generated process number to the first upper limit of generated process number.

Figure 8:
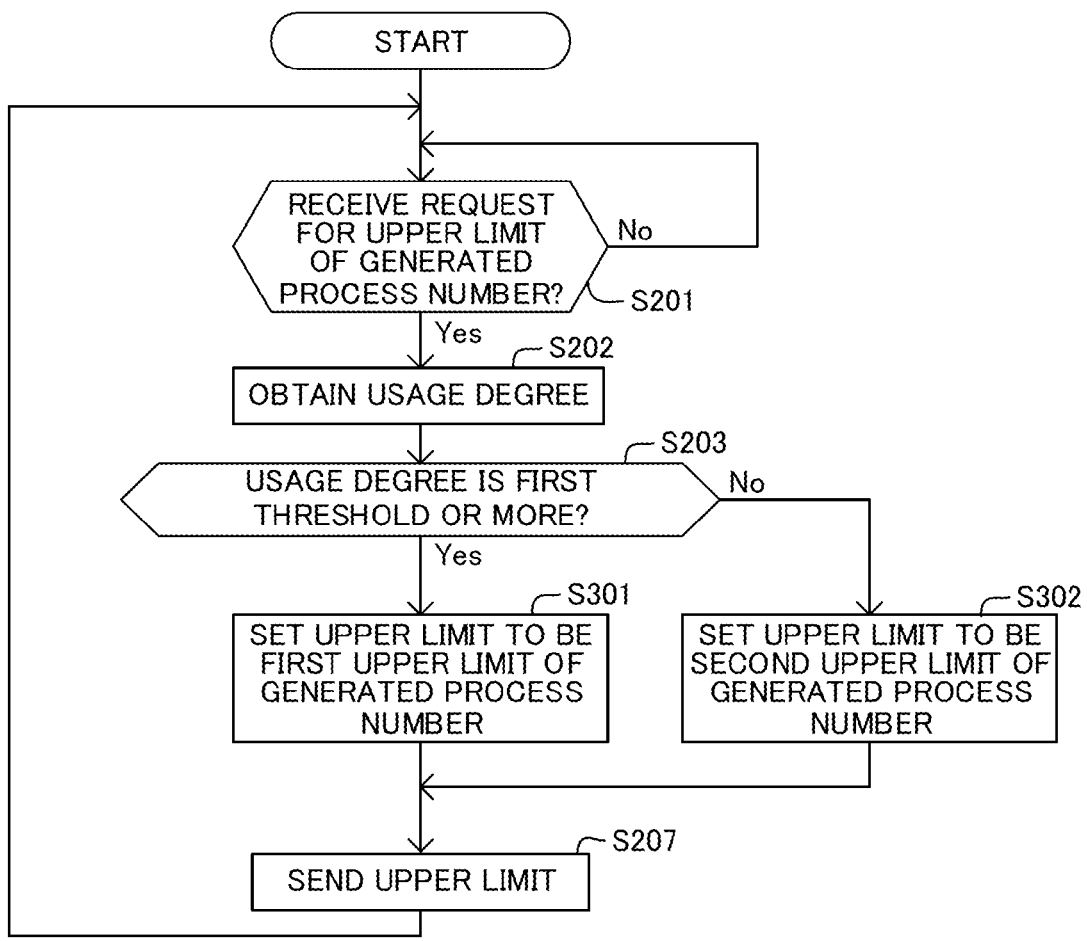
FIG. 8 is a flow diagram illustrating a succession of procedural steps that a control process executes in an example of a first modification of the first embodiment.

The control process executes the procedure of FIG. 8 in place of the procedure of FIG. 6 of the first embodiment. The procedure of FIG. 8 includes step S301 in place of steps S204-S206 of FIG. 6 and step S302 in place of steps S208-S210 of FIG. 6.

In this example, when the usage degree obtained in step S202 is equal to or larger than the first threshold, the control process moves to step S301 where the upper limit of generated process number is set to be the first upper limit of generated process number. Then, the control process sends the set upper limit of generated process number to a task process that has sent a request for upper limit of generated process number received by the control process at step S201 (step S207 of FIG. 8).

In contrast, when the usage degree obtained in step S202 is less than the first threshold, the control process moves to step S302 where the upper limit of generated process number is set to be the second upper limit of generated process number. Then, the control process sends the set upper limit of generated process number to a task process that has sent a request for upper limit of generated process number received by the control process at step S201 (step S207 of FIG. 8).

As described above, adjusting the number of task processes to be generated on the basis of the usage degree likewise the information processing device 10 of the first embodiment, the information processing device 10 of the first modification of the first embodiment ensures the same effects and advantages as those of the first embodiment.

Second Embodiment

Next, description will now be made in relation to an information processing device according to a second embodiment. The information processing device according to the second embodiment is different from the information processing device of the first embodiment in the point that the device is configured to reduce, when the usage degree is excessively large, the number of tasks to be executed in parallel. The following description will focus on the above difference. Like reference numbers designate similar or substantially similar elements and parts between the first embodiment and the second embodiment.

(Function)

Figure 9:
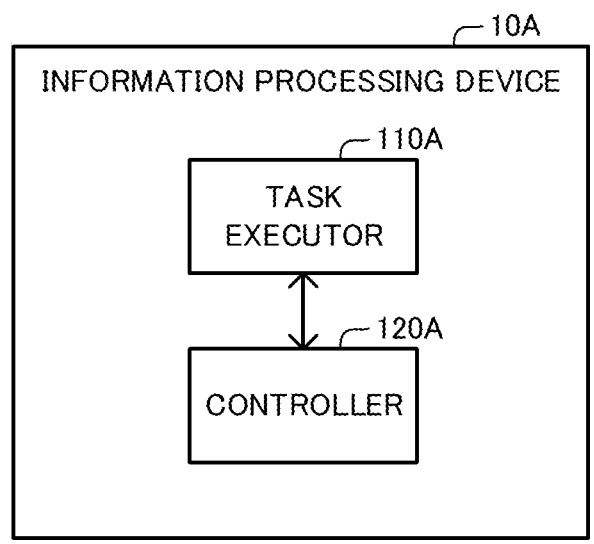
FIG. 9 is a block diagram illustrating the function of an information processing device according to an example of a second embodiment.

As illustrated in FIG. 9, the functions of the information processing device 10A according to the second embodiment includes a task executor 110A and a controller 120A, which are functionally substitute for the task executor 110 and the controller 120 of the first embodiment, respectively.

The controller 120A has the same function as the controller 120 of the first embodiment.

Furthermore, the control process generated by the controller 120A executes the following procedure.

When the usage degree (in this example, the memory using ratio) is equal to or larger than a certain second threshold (in this example, 90%), the control process sends an integration instruction to a task process that has sent a request for the upper limit of generated process number to the control process. The second threshold is set to be larger than the first threshold. An integration instruction includes information to specify a task process (integration destination process) of an integration destination.

As to be detailed below, the control process sending an integration instruction is an example of controlling the task controller 110A to generate no task process that is to execute a task belonging to the unexecuted task group.

The task executor 110A has the same function as the task executor 110 of the first embodiment.

Furthermore, a task process generated by the task executor 110A execute the following procedure.

When a task process receives an integration instruction, not receiving the upper limit of generated process number in response to a request for the upper limit of generated process number sent to the control process, the task process generates no task process. Additionally, in this case, the task process sends all the pieces of retained unexecuted task information to an integration destination process that is specified by the received integration instruction. An integration destination process is an example of a process generated by another process.

(Operation)

Figure 10:
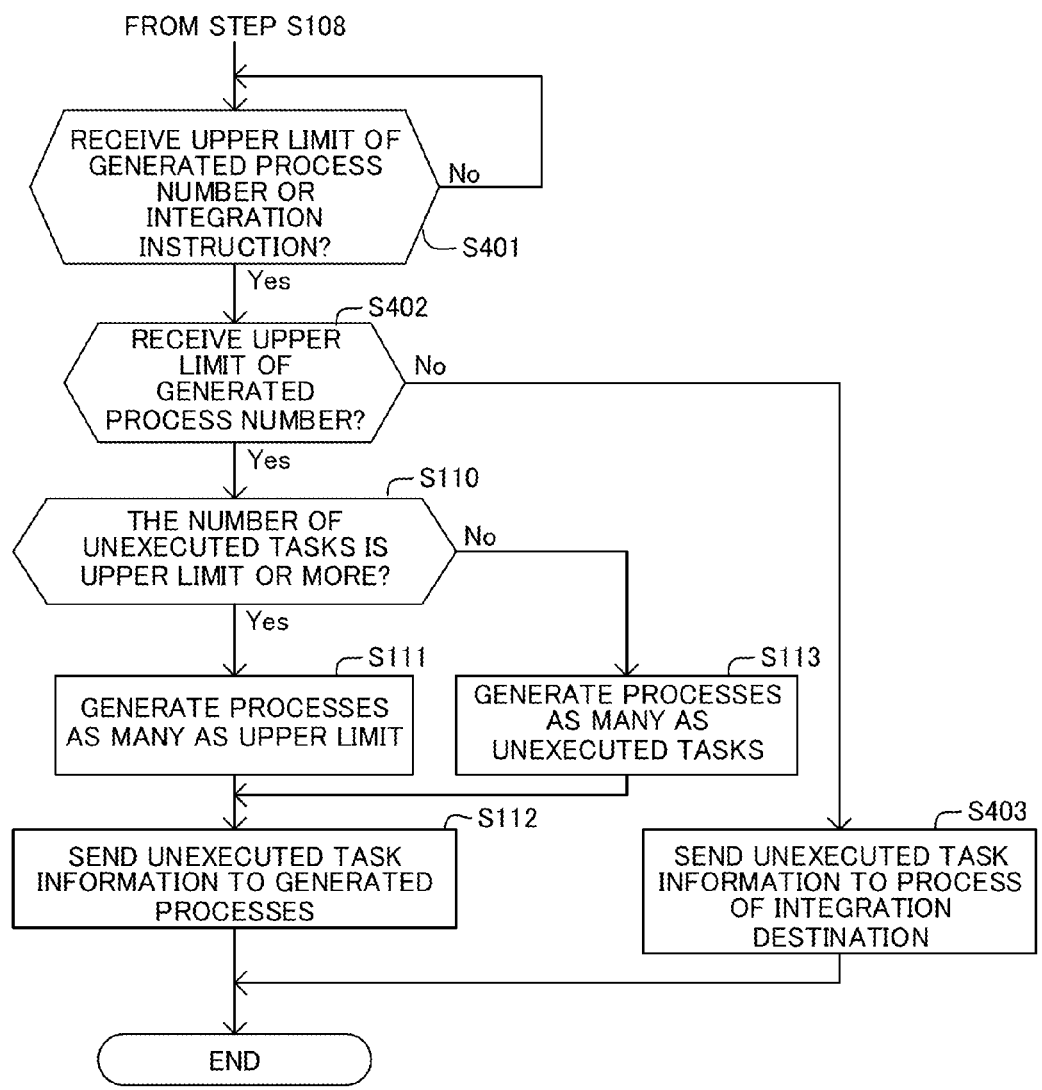
FIG. 10 is a flow diagram illustrating a succession of procedural steps that a task process executes in the example of the second embodiment.

A task process TP executes the procedure illustrated in the flow diagram of FIG. 10 in place of the procedure illustrated in FIG. 5 of the first embodiment. In this example, the procedure of FIG. 10 is the same as the procedure of FIG. 5 with the exception that the step S109 of FIG. 5 is substituted with steps S401-S403.

Figure 11:
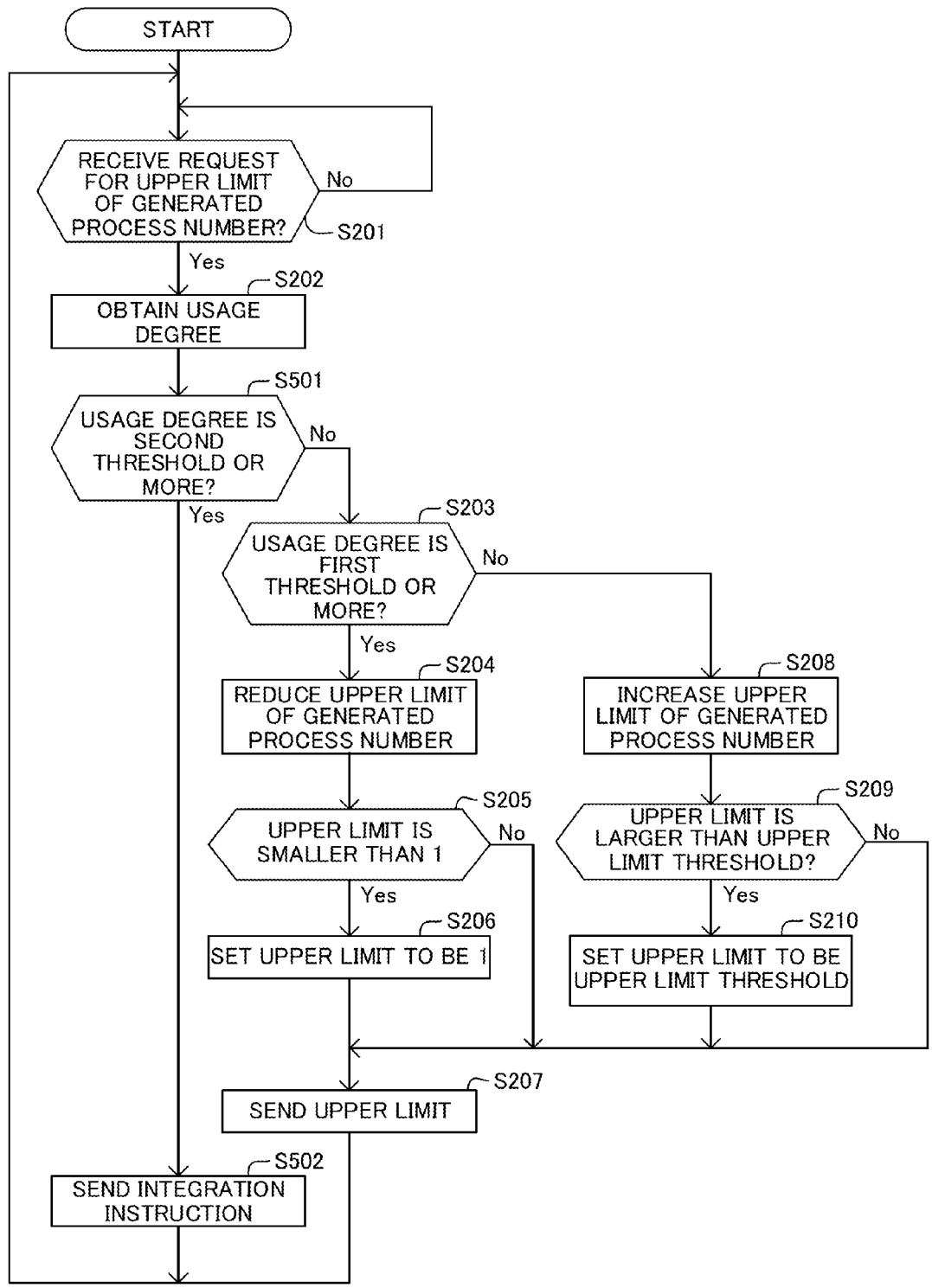
FIG. 11 is a flow diagram illustrating a succession of procedural steps that a control process executes in the example of the second embodiment.

The control process executes the procedure illustrated in the flow diagram of FIG. 11 in place of the procedure illustrated in FIG. 6 of the first embodiment. In this example, the procedure of FIG. 11 has steps S501 and S502 between the steps S202 and S203 of FIG. 6 in addition to the procedure of FIG. 6.

Figure 12:
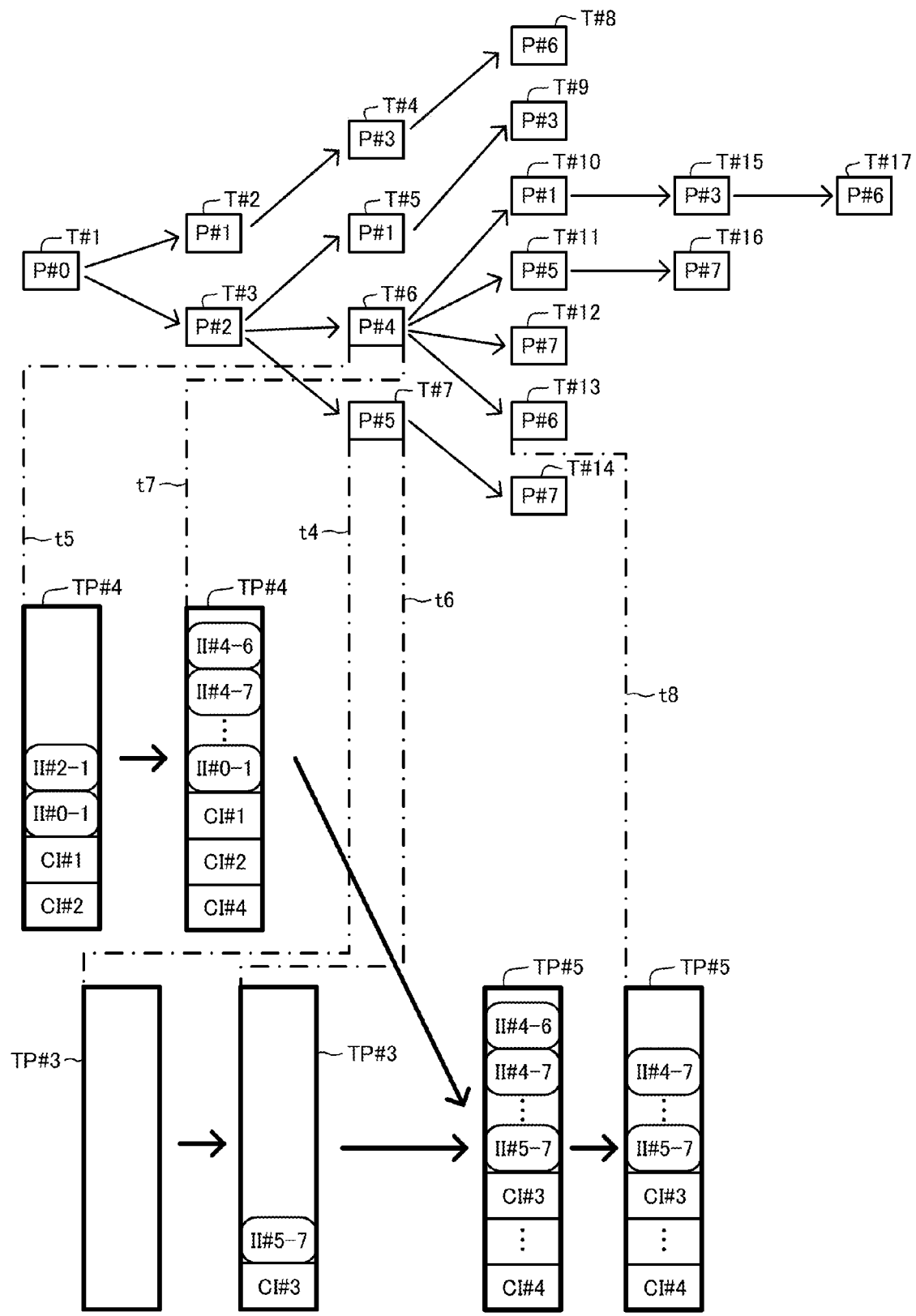
FIG. 12 is a diagram schematically illustrating change in task process and change in information that the task process retains in the example of the second embodiment.

Here, as illustrated in FIG. 12, it is assumed that the information processing device 10A operates in the same manner as the information processing device 10 of the first embodiment and reaches time points t4 and t5.

In this case, at time point t4, the task process TP#3 does not retain unexecuted task information. Likewise, at time point t5, the task process TP#4 retains individual information II#0-1 and II#2-1 and common information CI#1 and CI#2.

Then, the task process TP#3 executes the task T#7 represented by the obtained seventh unexecuted task information (step S104 of FIG. 5). Likewise, the task process TP#4 executes the task T#6 represented by the obtained sixth unexecuted task information (step S104 of FIG. 5). This means that the information processing device 10A executes two tasks in parallel.

In the present embodiment, the task process TP#3 executes the task T#7, thereby obtains a web page (target page) P#5, evaluates the obtained target page P#5, and specifies the reference destination web page P#7 referred by the target page P#5. This generates new task #14 (fourteenth task).

The task process TP#3 newly retains fourteenth unexecuted task information representing the new task T#14 (step S106 of FIG. 5) In the present embodiment, the fourteenth unexecuted task information consists of individual information II#5-7 and common information CI#3.

As illustrated in FIG. 12, at time point t6, the task process TP#3 retains individual information II#5-7 and common information CI#3.

Then, the task process TP#3 sends a request for the upper limit of generated process number to the control process (step S108 of FIG. 5). Next, the task process TP#3 is on standby until receiving an upper limit of generated process number or an integration instruction ("No" route of step S401 of FIG. 10).

Upon receipt of a request for the upper limit of generated process number from the task process TP#3, the control process obtains the latest usage degree among the usage degrees that have been obtained each time an obtaining cycle elapses (step S202 of FIG. 11).

Then, the control process determines whether the obtained usage degree is equal to or larger than the second threshold (step S501 of FIG. 11). Here, it is assumed that the usage degree is smaller than the second threshold. In this case, the control process determines "No", moves to step S203, and then executes the procedure of steps S203-S210 likewise the first embodiment.

Here, it is assumed that the usage degree is equal to or larger than a first threshold. In this case, the control process updates the retained upper limit to "1" (step S204 of FIG. 11). Then, the control process sends the updated upper limit of generated process number to a task process (here, task process TP#3) that has sent the request for the upper limit of generated process number to the control process in step S201. Then, the control process returns to step S201.

On the other hand, the task process TP#3 receives the upper limit of generated process number. This causes the task process TP#3 to determine "Yes" in step S401 and further determine whether the upper limit of generated process number is received (step S402 of FIG. 10). At this time, the task process TP#3 determines "Yes" and generates one or more task processes as many as the upper limit of generated process number (step S111). At this time, the task process TP#3 generates a single task process.

Next, the task process TP#3 sends all the retained unexecuted task information (here, the fourteenth unexecuted task information) to the generated task process TP#5 (step S112 of FIG. 10). In the present embodiment, the task process TP#3 sends individual information II#5-7 and common information CI#3 to the task process TP#5.

The task process TP#3 terminates the procedure illustrated in FIG. 10. Thereby, the task process TP#3 disappears. Accordingly, the buffer region associated with the task process TP#3 is released.

The task process TP#4 executes task T#6, thereby obtains a web page (target page) P#4, and evaluates the obtained target page P#4. Furthermore, the task process TP#4 specifies reference destination web page P#1, P#5, P#7, and P#6 referred by the target page P#4. This newly generates a task T#10 (tenth task), a task T#11 (eleventh task), a task T#12 (twelfth task), and a task T#13 (thirteenth task).

The task process TP#4 newly retains unexecuted task information (here, the tenth unexecuted task information to the thirteenth unexecuted task information) representing the new tasks T#10-T#13 (step S106 of FIG. 5). As illustrated in FIG. 10, the tenth unexecuted task information consists of individual information II#4-1 and common information CI#4; the eleventh unexecuted task information consists of individual information II#4-5 and common information CI#4; the twelfth unexecuted task information consists of individual information II#4-7 and common information CI#4; and the thirteenth unexecuted task information consists of individual information II#4-6 and common information CI#4.

Namely, as illustrated in FIG. 12, at time point t7, the task process TP#4 retains individual information II#0-1, II#2-1, II#4-1, II#4-5, II#4-7, and II#4-6 and common information CI#1, CI#2, and CI#4.

The task process TP#4 sends a request for the upper limit of generated process number to the control process (step S108 of FIG. 5). Next, the task process TP#4 is on standby until receiving the upper limit of generated process number or an integration instruction from the control process ("No" route in step S401 of FIG. 10).

Upon receipt of a request for the upper limit of generated process number from the task process TP#4, the control process obtains the latest usage degree among the usage degrees that have been obtained each time an obtaining cycle elapses (step S202 of FIG. 11).

Then, the control process determines whether the obtained usage degree is equal to or larger than the second threshold (step S501 of FIG. 11). Here, it is assumed that the usage degree is equal to or larger than the second threshold. In this case, the control process determines "Yes" and sends an integration instruction to the task process TP#4 that has been send a request for the upper limit of generated process number to the control process in step S201 (step S502 of FIG. 11).

In the present embodiment, when a task process is generated, the control process retains an identifier (process ID) to specify the generated task process. Furthermore, when a task process disappears, the control process ends to retain the process ID to specify the disappearing process.

The control process selects one process ID among retained multiple process IDs and sends an integration instruction containing the selected process ID to a task process that has sent a request for the upper limit of generated process number to the control process. In the present embodiment, the control process sends an integration instruction containing a process ID to specify the task process TP#5 to the task process TP#4.

After that, the control process returns to step S201.

The task process TP#4 receives the integration instruction from the control process. Consequently, the task process TP#4 determines "Yes" in the step S401 of FIG. 10 and further determines whether the task process TP#4 receives the upper limit of generated process number (step S402 of FIG. 10). At this time, the task process TP#4 determines "No" and sends all the retained unexecuted task information to the integration destination process (step S403 of FIG. 10).

The integration destination process is a task process that is specified by the process ID contained in the integration instruction. Here, the integration destination process is the task process TP#5. Namely, the task process TP#4 sends individual information II#0-1, II#2-1, II#4-1, II#4-5, II#4-7, and II#4-6 and common information CI#1, CI#2, and CI#4 to the task process TP#5.

Thereby, the task process TP#5 receives the unexecuted task information from the task process TP#4 and newly retains the received unexecuted task information (step S102 of FIG. 5). After that, the task process TP#5 executes the procedure illustrated in FIG. 10 as detailed above.

Namely, as illustrated in FIG. 12, the task process TP#5 retains individual information II#5-7, II#0-1, II#2-1, II#4-1, II#4-5, and II#4-7, and common information CI#3, CI#1, CI#2, and CI#4 at time point t8. At time point t8, the task process TP#5 obtains one piece of unexecuted task information and after that, starts the execution of the task #13.

As the above, the information processing device 10A of the second embodiment ensures the same operation and effects as those of the information processing device 10 of the first embodiment.

Furthermore, when the number of tasks included in the unexecuted task group is one or more at the completion of a task and the usage degree of the information processing device 10A of the second embodiment is larger than the second threshold, the information processing device 10A generates no task process. Here, the second threshold is larger than the first threshold.

This means that, when the usage degree is excessively large, no task process is generated. Consequently, the load on the information processing device 10A can be reduced as compared to a case where a task process is generated even when the usage degree is excessively large.

In a case where a task process generates no task process, the information processing device 10A of the second embodiment sends retained unexecuted task information to a task process generated by another process.

This makes it possible to reliably execute a task that has not been executed yet.

Figure 13:
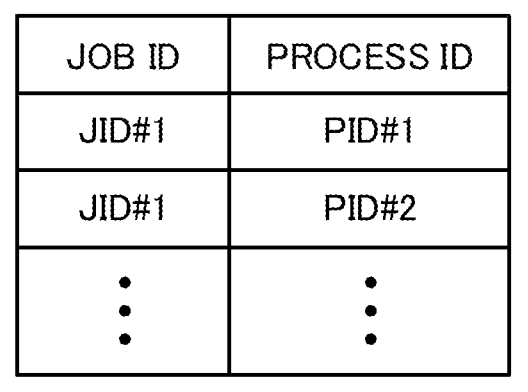

Alternatively, the information processing device 10A may be configured to execute multiple jobs. In this case, as illustrated in FIG. 13, the control process preferably retains a job identifier (job ID) to specify a job and a process ID in association with each other. More preferably, the control process selects a process ID to be contained in an integration instruction among process IDs associated with a job ID the same as the job ID associated with a task process that has sent a request for the upper limit of generated process number to the control process.

The embodiments and the modification of the present invention are detailed as above, but the present invention should by no means be limited to the foregoing embodiments and modification. Various changes and modification that those ordinarily skilled in the art would understand can be suggested without departing from the spirit of the present invention.

The job that the information processing device executes may be a job different from that exemplified in the embodiments. In this case, the job to be executed by the information processing device is a job consisting of a task that, when being executed, generates another task. Furthermore, when execution of a task constituting a job generates multiple tasks, the multiple generated tasks may have no dependency of one another.

As another modification of the embodiments, the foregoing embodiments and modification can be appropriately combined without departing from the spirit of the present invention.

As a result, the resource of an information processing device can be efficiently used.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing device comprising at least one processor, the at least one processor is adapted to:
cause a second process to
retain one or more pieces of unexecuted task information received from a first process, which has generated the second process, the one or more pieces of unexecuted task information being information used for executing one or more unexecuted tasks not having been executed yet,
obtain one piece of the unexecuted task information among the retained one or more pieces of unexecuted task information,
end to retain the obtained piece of unexecuted task information,
execute a first task represented by the obtained piece of unexecuted task information,
when the execution of the first task represented by the obtained piece of unexecuted task information generates one or more second tasks, retain unexecuted task information representing the generated one or more second tasks, and
when the retained unexecuted task information remains when the execution of the first task is completed, generate one or more processes, that are to execute one or more tasks represented by the retained unexecuted task information, send the retained unexecuted task information to the generated one or more processes and disappears; and
control a number of processes to be generated in such a manner that a number of tasks to be executed in parallel is adjusted on the basis of a usage degree representing a degree of usage of resource in the information processing device.

2. The information processing device according to claim 1, wherein, when the usage degree is more than a first threshold, the at least one processor causes the second process to generate a single process.

3. The information processing device according to claim 1, wherein, when the usage degree is less than a first threshold, the at least one processor causes the second process to generate a plurality of processes.

4. The information processing device according to claim 1, wherein, when the usage degree is more than a second threshold, the at least one processor causes the second process to generate no process.

5. The information processing device according to claim 1, wherein:
the information processing device retains an upper limit of generated process number representing the upper limit of the number of processes to be generated;
the at least one processor generates the one or more processes equal to or less than the upper limit of generated process number; and
the at least one processor adjusts the retained upper limit of generated process number on the basis of the usage degree.

6. The information processing device according to claim 1, wherein, when the second process generates a single process, that is to execute a task represented by the retained unexecuted task information, the at least one processor sends all pieces of the retained unexecuted task information to the single process.

7. The information processing device according to claim 1, wherein, when the second process generates a plurality of processes, that are to execute tasks represented by the retained unexecuted task information, the at least one processor distributes the retained unexecuted task information to the plurality of processes.

8. The information processing device according to claim 1, wherein, when the second process generates no process, that is to execute a task represented by the retained unexecuted task information, the at least one processor sends the retained unexecuted task information to a third process generated by a fourth process.

9. A method for processing information in an information processing device, the method comprising:
causing a second process to
retain one or more pieces of unexecuted task information received from a first process, which has generated the second process, the one or more pieces of unexecuted task information being information used for executing one or more unexecuted tasks not having been executed yet,
obtain one piece of the unexecuted task information among the retained one or more pieces of unexecuted task information,
end to retain the obtained piece of unexecuted task information,
execute a first task represented by the obtained piece of unexecuted task information,
when the execution of the first task represented by the obtained piece of unexecuted task information generates one or more second tasks, retain unexecuted task information representing the generated one or more second tasks, and
when the retained unexecuted task information remains when the execution of the first task is completed, generate one or more processes, that are to execute one or more tasks represented by the retained unexecuted task information, send the retained unexecuted task information to the generated one or more processes and disappears; and
control a number of processes to be generated in such a manner that a number of tasks to be executed in parallel is adjusted on the basis of a usage degree representing a degree of usage of resource in the information processing device.

10. The method for processing information according to claim 9, wherein, when the usage degree is more than a first threshold, the generated one or more processes is a single process.

11. The method for processing information according to claim 9, wherein, when the usage degree is less than a first threshold, the generated one or more processes are a plurality of processes.

12. The method for processing information according to claim 9, wherein, when the usage degree is more than a second threshold, the generated one or more processes is no process.

13. A non-transitory recording medium having stored therein a program for causing a computer to execute a procedure comprising:
causing a second process to
retain one or more pieces of unexecuted task information received from a first process, which has generated the second process, the one or more pieces of unexecuted task information being information used for executing one or more unexecuted tasks not having been executed yet,
obtain one piece of the unexecuted task information among the retained one or more pieces of unexecuted task information,
end to retain the obtained piece of unexecuted task information,
execute a first task represented by the obtained piece of unexecuted task information,
when the execution of the first task represented by the obtained piece of unexecuted task information generates one or more second tasks, retain unexecuted task information representing the generated one or more second tasks, and
when the retained unexecuted task information remains when the execution of the first task is completed, generate one or more processes, that are to execute one or more tasks represented by the retained unexecuted task information, send the retained unexecuted task information to the generated one or more processes and disappears; and
control a number of processes to be generated in such a manner that a number of tasks to be executed in parallel is adjusted on the basis of a usage degree representing a degree of usage of resource in the information processing device.

14. The non-transitory computer-readable recording medium according to claim 13, wherein, when the usage degree is more than a first threshold, the generated one or more processes is a single process.

15. The non-transitory computer-readable recording medium according to claim 13, wherein, when the usage degree is less than a first threshold, the generated one or more processes are a plurality of processes.

16. The non-transitory computer-readable recording medium according to claim 13, wherein, when the usage degree is more than a second threshold, the generated one or more processes is no process.

* * * * *